US008763801B2

(12) United States Patent  
Lau

(10) Patent No.: US 8,763,801 B2  
(45) Date of Patent: Jul. 1, 2014

(54) HINGEDLY CONNECTABLE DISK TRAYS AND DISK PROTECTIVE ENCLOSURE FOR SAME

(75) Inventor: Kwok Din Lau, Hong Kong (CN)

(73) Assignee: Finest Products Limited, Hong Kong (HK)

( * ) Notice: Subject to any disclaimer, the term of this patent is extended or adjusted under 35 U.S.C. 154(b) by 190 days.

(21) Appl. No.: 12/535,210

(22) Filed: Aug. 4, 2009

(65) Prior Publication Data

US 2011/0031141 A1    Feb. 10, 2011

(51) Int. Cl.  
*G11B 33/02* (2006.01)

(52) U.S. Cl.  
USPC ......... 206/308.1; 206/311; 206/472; 206/445

(58) Field of Classification Search  
USPC ............. 206/303, 308.1, 311, 312, 307, 472, 206/493, 445, 308.3, 450, 509, 820; 220/23.6, 23.4  
See application file for complete search history.

(56) References Cited

U.S. PATENT DOCUMENTS

| | | | |
|---|---|---|---|
| 4,892,189 A | | 1/1990 | Kunimune et al. |
| 5,332,086 A | * | 7/1994 | Chuang ..................... 206/759 |
| 5,617,950 A | * | 4/1997 | Chung ..................... 206/308.1 |
| 5,697,498 A | | 12/1997 | Weisburn et al. |
| 5,720,384 A | * | 2/1998 | Wu-Chen ................. 206/308.1 |
| 5,996,785 A | * | 12/1999 | Palmer et al. ............ 206/308.1 |
| 6,554,132 B2 | | 4/2003 | Lau |
| 6,749,061 B2 | * | 6/2004 | Clausen ................... 206/308.1 |
| 6,899,233 B2 | * | 5/2005 | Taylor ....................... 211/40 |
| 7,322,468 B2 | | 1/2008 | Kwan |
| 7,451,871 B2 | * | 11/2008 | Schuurs ................... 206/308.1 |
| 7,942,267 B2 | * | 5/2011 | Coe et al. ................. 206/536 |
| 2005/0241970 A1 | | 11/2005 | Choi |
| 2007/0012582 A1 | | 1/2007 | Lau |
| 2007/0170078 A1 | | 7/2007 | Choi et al. |
| 2010/0126890 A1 | * | 5/2010 | Libohova ................. 206/307 |

FOREIGN PATENT DOCUMENTS

| | | |
|---|---|---|
| CN | 2304975 Y | 1/1999 |
| CN | 2341241 Y | 9/1999 |

OTHER PUBLICATIONS

International Preliminary Report on Patentability, International Application No. PCT/CN2010/075582, Date of Mailing Feb. 16, 2012.  
Office Action issued on Jun. 11, 2013 in Japanese Patent Application No. 2012-523192.

* cited by examiner

*Primary Examiner* — Anthony Stashick  
*Assistant Examiner* — Robert Poon  
(74) *Attorney, Agent, or Firm* — Danton K. Mak; Sheldon Mak & Anderson PC

(57) ABSTRACT

A disk storage system for disks having a central opening includes a set of hingedly connectable disk trays, a pair of axle members for attachment to one of the trays on an axle axis thereof, and a storage container having hinge pedestals for engagement by the axle members. Hinged connections between adjacent trays is by tabs that are pivotable on respective hinge axes of the different trays, the tabs being engagable with respective tab cavities of adjacent trays.

16 Claims, 4 Drawing Sheets

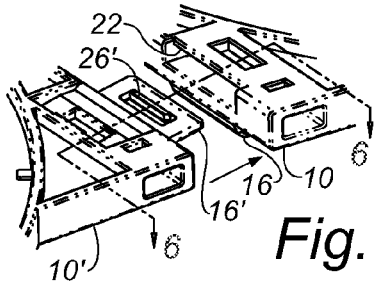
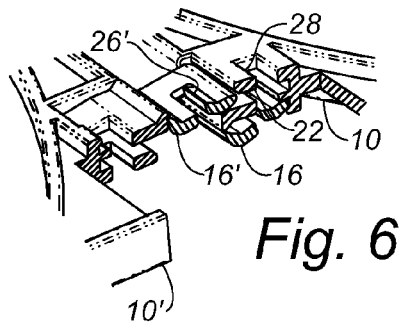
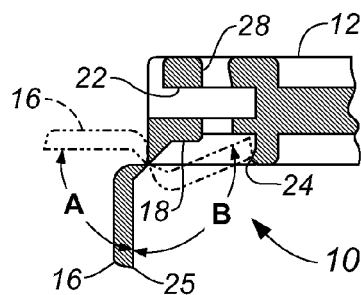
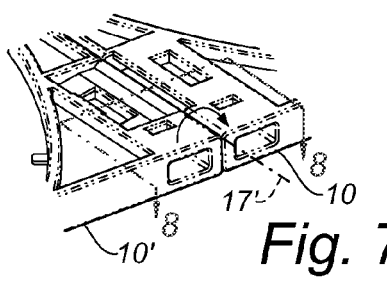
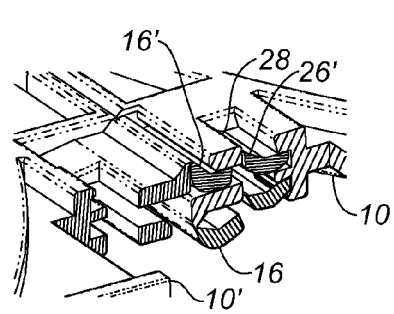
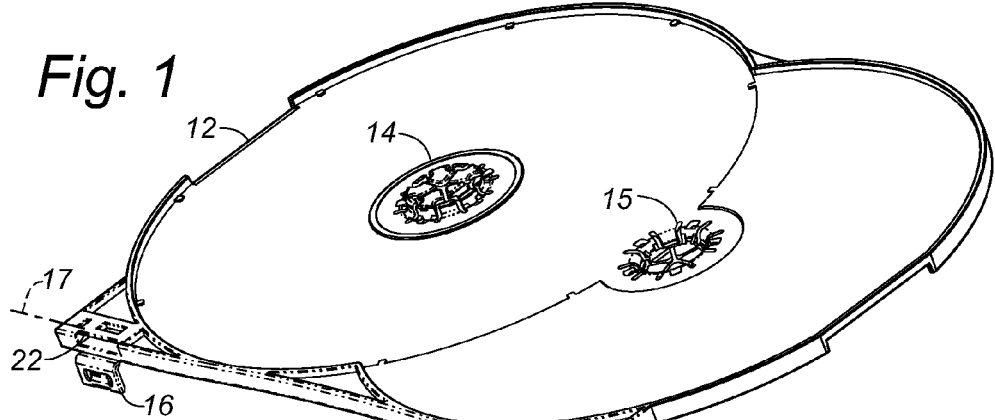
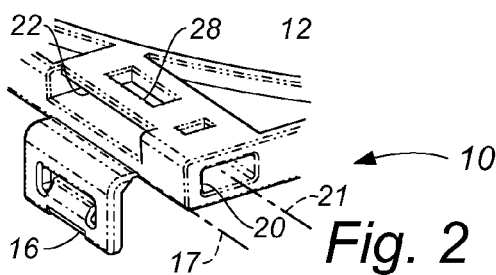
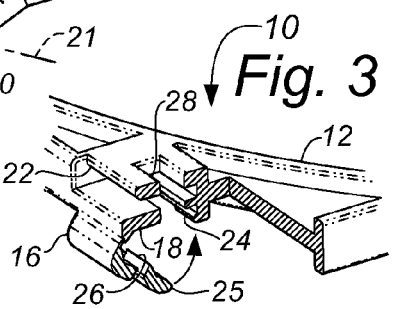

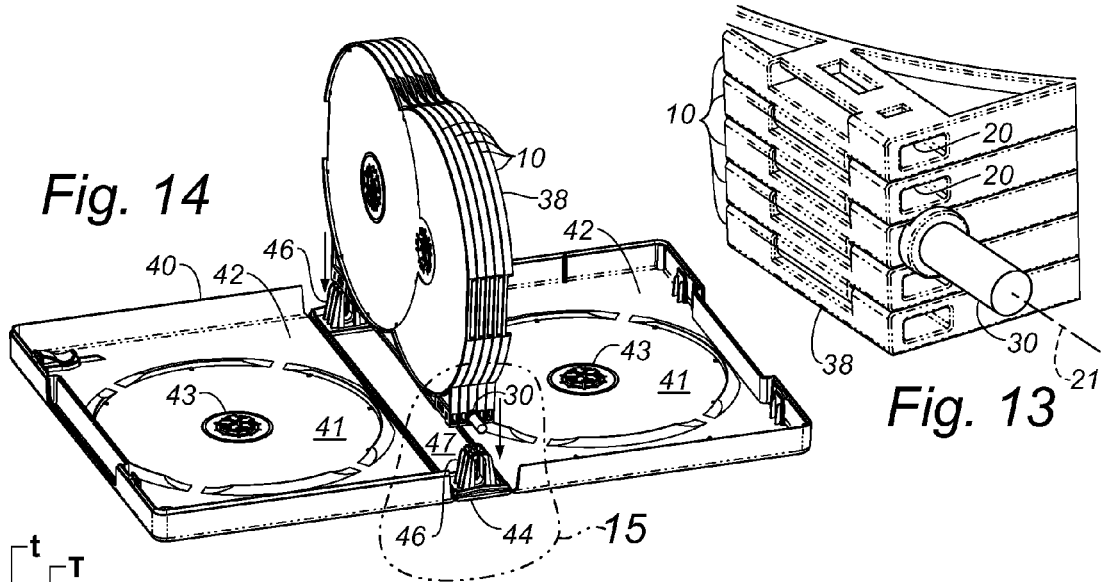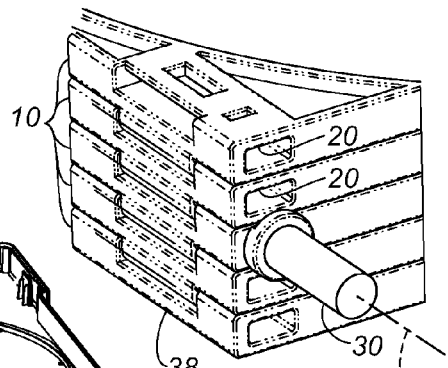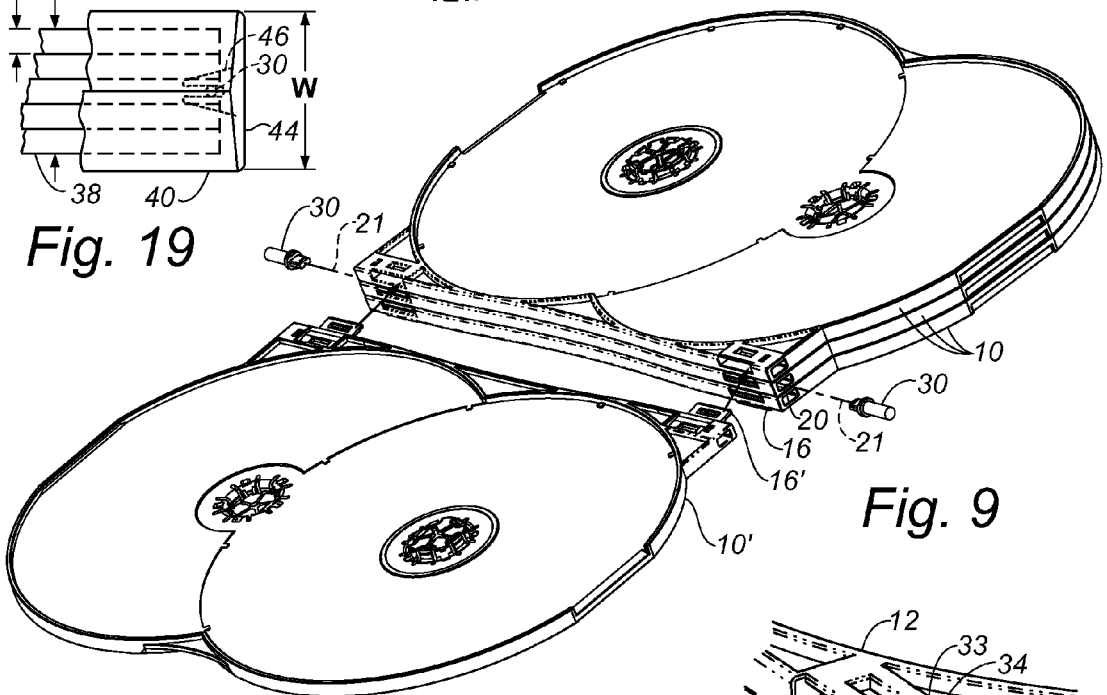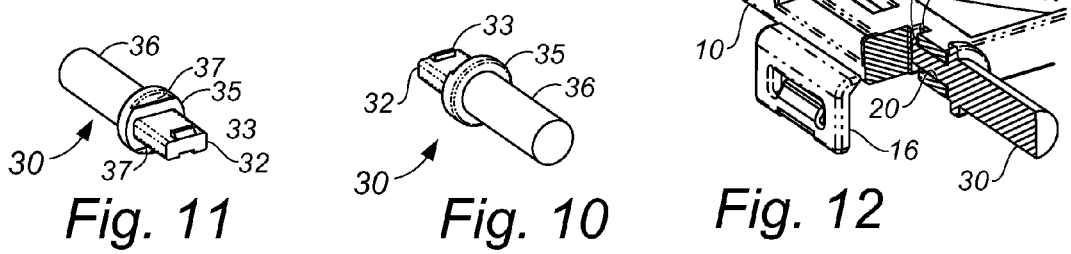

HINGEDLY CONNECTABLE DISK TRAYS AND DISK PROTECTIVE ENCLOSURE FOR SAME

BACKGROUND

The present invention relates to optical data disks such as compact disks (CDs) and video disks (DVDs) that have central circular locating openings, and more particularly to devices for protectively enclosing such disks for storage of same.

Disk storage containers having trays for multiple disks are known. See, for example, U.S. Pat. No. 5,697,498 to Weisburn et al., U.S. Pat. No. 6,554,132 to the present inventor, and U.S. Pat. No. 7,322,468 to Kwan. These containers have not been entirely satisfactory in that they are excessively bulky, excessively complex, and/or having loose parts of different sizes and configurations that are difficult to assemble and easy to misplace.

Thus there is a need for a protective disk container that has an integrally formed enclosure, that can be inexpensively converted for multiple disk storage, and that otherwise overcomes the disadvantages of the prior art.

SUMMARY

The present invention meets this need by providing a molded disk container that accommodates multiple disk trays of identical configuration and which can be joined and rejoined in any order. In one aspect of the invention, a first disk tray includes a tray panel portion having a hub for holding one of the disks; a tab portion hingedly connected to the panel portion on a tab axis, the tab axis being located along a side corner margin of the tray portion; and with the tray panel portion including a tab cavity for receiving a tab portion of a second disk tray, whereby the first and second disk trays become hingedly connected on the tab axis and pivotable from an open, coplanar condition to a closed facing condition. It will be understood that when the second tray has a counterpart of the tab cavity of the first tray, the tab portion of the first tray can be received into the tab cavity of the second tray, the pivoting being about the tab axis of the first tray. Preferably the tab portion has a tab catch formed thereon and the tray panel portion has a tab catch cavity intersecting the tab cavity for snap engagement by a tab catch of the second disk tray. Preferably the tab catch cavity is formed by a tab catch opening in the tray panel portion for facilitating disengagement of the tab catch of the second disk tray. The tab portion can be a first tab portion, the tab cavity being a first tab cavity, the disk tray further including a second tab portion hingedly connected to the panel portion on the tab axis and spaced apart from the first tab portion; and the tray panel portion having a second tab cavity, the first and second tab cavities being spaced apart correspondingly to the first and second tab portions for receiving a second tab portion of the second disk tray, whereby the first and second disk trays become hingedly connected on the tab axis by both tab portions of the second disk tray engaging the tab cavities of the first disk tray.

Preferably the tray panel portion is formed having a tab storage cavity proximate the tab axis for receiving a portion of the tab portion in a storage position within the tray panel portion. Preferably the tray panel portion is formed having a lip projection extending into the tab storage cavity for releasably holding the tab portion in a storage position.

Preferably the tray panel portion defines an axle axis for pivotable support of the tray. Preferably the axle axis is oriented parallel to the hinge axis for facilitating leafing through a connected set of disk trays that is pivotably supported on the axle axis. The axle axis can be defined by a pair of oppositely oriented axle cavities in opposite end extremity portions of the tray panel portion for receiving a pair of axle members. Preferably the tray panel portion has a pair of axle barb cavities intersecting respective ones of the axle cavities for engagement by corresponding barbs of the axle members. Preferably each of the barb cavities is formed by an axle barb opening for facilitating disengagement of the axle barbs. As an alternative to the axle cavities, the tray can have a pair of axle portions integrally formed with the tray panel portion on the axle axis.

Preferably the hub of the disk tray is a first hub, the tray panel portion having a second hub for holding an additional one of the disks. Preferably the hubs are in offset relation to each other on opposite sides of the tray panel portion for permitting reduced thickness of the tray.

In another aspect of the invention, a disk storage system includes a storage container having a pair of main panel portions hingedly connected along opposite side extremities of a spine portion, and a spaced pair of hinge pedestals projecting from an inside surface of the spine portion; a set of N of the disk trays having the tray panel portion with a hub, the tab portion, and the tab cavity in the tray panel portion; and a pair of axle members that each have a shank portion for engaging the axle cavities of one of the disk trays and a shaft portion for engaging respective ones of the hinge pedestals, whereby, when the disk trays are hingedly connected by engagement of the tab portions of N−1 of the trays with the tab cavities of different trays, and when the axle members are engaging the axle cavities of one of the trays, the axle members are engagable with the hinge pedestals of the storage container for pivotable support of the set of disk trays, the container in the closed condition enclosing the set of disk trays. It will be understood that N is an integer number of the trays being connected, and N can be only one, in which case only a single tray would be enclosed in the container, and its tab cavity would be empty. Preferably the hinge pedestals are each formed having a U-shaped slot for engagement by the shaft portions of the axle members, the slot facing away from the inside surface of the spine member for permitting the axle members to move relative to the inside surface of the spine portion when the one disk tray is pivoted about the axle axis thereof. Preferably the hinge pedestals each have a restriction element proximate a distal extremity of the U-shaped slot for snap engagement of the axle member shaft portion of the corresponding axle member into the slot.

Preferably each of the main panel portions is formed having a hub on an inside surface thereof for holding an additional pair of disks. Preferably the hub of each disk tray is a first hub, the tray panel portion of each disk tray having a second hub for holding an additional one of the disks, the hubs being in offset relation to each other on opposite sides of the tray panel portion; and with the system including five of the disk trays, the case in the closed condition has an overall width W of not more than approximately 27.5 mm with each of a total of twelve enclosed hubs holding a data disk having a disk thickness of up to approximately 1.3 mm.

Preferably the tab portion of each of the disk trays has a tab catch formed thereon and the tray panel portion is formed having a tab catch cavity intersecting the tab cavity for snap engagement by a tab catch of a different disk tray of the set, the tab catch cavity being formed by a tab catch opening in the tray panel portion for facilitating disengagement of the tab catch of the different disk tray.

Preferably the tray panel portion of at least one of the disk trays is formed having a tab storage cavity proximate the tab axis for receiving a portion of the tab portion in a storage position thereof, the tray panel portion is formed having a lip projection extending into the tab storage cavity for releasably holding the tab portion in a storage position.

Preferably each of the axle members has a barb formed on the stem portion thereof, and the tray panel portion of each disk tray is formed having a pair of axle barb cavities intersecting respective ones of the axle cavities for engagement by corresponding barbs of the axle members.

DRAWINGS

These and other features, aspects, and advantages of the present invention will become better understood with reference to the following description, appended claims, and accompanying drawings, where:

FIG. 1 is a perspective sectional view of a pivotable disk tray according to the present invention;

FIG. 2 is a perspective detail view of a tab portion of the tray of FIG. 1, the tab portion being in an open, relaxed position;

FIG. 3 is a sectional perspective detail view showing the tab portion moving toward a closed condition;

FIG. 4 is a detail sectional view showing a range of travel of the tab portion;

FIG. 5 is a sectional perspective detail view showing portions of two of the trays of FIG. 1, the tab portion of one tray being aligned for insertion into the other tray;

FIG. 6 is a perspective sectional detail view on line 6-6 of FIG. 5;

FIG. 7 is a detail view, showing the trays in connected, coplanar relation;

FIG. 8 is a sectional detail view on line 8-8 of FIG. 7;

FIG. 9 is a perspective view showing three of the trays of FIG. 1 in connected, facing relation, and a fourth tray aligned for insertion of the tab portions thereof into one of the other trays, and further showing a pair of axle members aligned for insertion into one of the trays;

FIG. 10 is a front perspective detail view of one axle member of FIG. 9;

FIG. 11 is a rear perspective view of the axle member of FIG. 10;

FIG. 12 is a perspective sectional detail view showing one of the axle members of FIGS. 10 and 11 engaged with one of the trays of FIG. 9;

FIG. 13 is a perspective detail view showing five of the trays of FIG. 1 in connected, facing relation, the axle member of FIG. 10 being engaged with a central one of the trays;

FIG. 14 is a perspective view showing the trays of FIG. 13 aligned for engagement with the hinge structure of a protective disk case;

FIG. 19 is a fragmentary partial end view of the case of FIG. 14 enclosing the trays of FIG. 13;

DESCRIPTION

Figure 23:
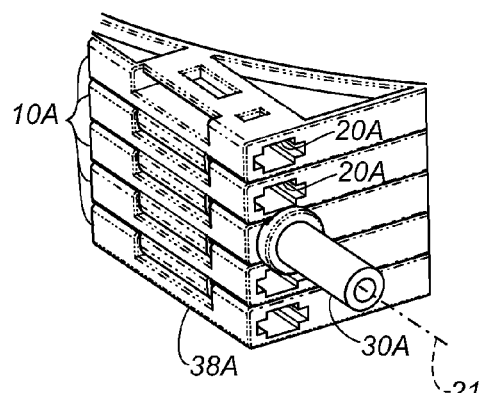
FIG. 23 is a perspective detail view as in FIG. 13, showing the axle member of FIG. 20 engaged with a central one of five trays having the configuration of FIG. 22.

The present invention is directed to a disk container that is particularly effective and configurable for protectively storing different numbers of disks such as CDS and DVDs. In one preferred configuration, with reference to FIGS. 1-8 of the drawings, a disk tray 10 includes a panel portion 12 that is configured for receiving on opposite sides thereof a pair of such disks (not shown) in laterally offset relation, the tray having an forwardly facing hub portion 14 and a rearwardly facing hub portion 15 for retaining the disks in a conventional manner. The tray includes a spaced pair of integrally formed tab members 16 that are connected to the panel portion 12 by so-called "living hinges" that define a hinge axis 17 of the tray 10 as shown in FIG. 2, the hinge axis extending along a longitudinal rear corner margin of the panel portion 12 for permitting pivotal movement of each tab member through an included angle of more than 180° as further described herein in connection with FIG. 4. As shown in FIGS. 3-8, the underside of the panel portion 12 is formed with a pair of tab storage cavities 18 for releasably holding the tab members 16 in respective retracted positions partially contained within the tab storage cavities at one extremity of the pivotal movement as shown in FIGS. 6 and 7. FIG. 4 further shows the tab member 16 having a first range of motion through an angle A from a rest position indicated by solid lines to a deployed position, and oppositely through an angle B to the retracted position. In the exemplary configuration shown in the drawings, the angle A is 90° and the angle B is approximately 113°.

Preferably the angles A and B total at least approximately 190° for effecting the partial containment of the tab portions 16 within the tab storage cavities in the respective retracted positions, the tab portions having snap engagement with the latch cavities as further described below.

The tray 10 is also formed with a pair of oppositely disposed axle cavities 20 for receiving respective axle members, described below, on an axle axis 21 that is relatively closely spaced parallel to the hinge axis 17 as best shown in FIG. 2. Additionally, the tray 10 is formed with a pair of tab cavities 22 for receiving tabs 16 of a different tray 10 as also described below.

FIGS. 5 and 6 show portions of two of the trays, a first tray being the tray 10 of FIGS. 1-4 and having the same orientation, and a second tray, designated 10', being inverted and having the tab members thereof, one being shown and designated 16', aligned in the deployed position for engagement with the corresponding tab cavity 22 of the first tray 10. FIGS. 7 and 8 show the trays 10 and 10' connected with the tab members 16' of the second tray 10' having snap engagement with the corresponding tab cavities 22 of the first tray 10. As indicated by the arrow in FIG. 7, the trays are pivotable toward facing relation about the hinge axis, designated 17', of the second tray 10'.

It will be understood that the above-described "snap engagements" can be achieved in a number of ways. In the exemplary configuration of the tray 10, for example, the snap engagement of the tab members 16 in the retracted positions is effected by respective lip elements 24 being formed to slightly project into the tab storage cavities 18 as shown in FIGS. 3 and 4 for snap engagement by a free end extremity 25 of the corresponding tab members 16. Similarly, the tab members are formed having projecting tab catch elements, one such being designated 26 in FIG. 3, another being designated 26' in FIGS. 5, 6, and 8, the tab catch element 26' of the second tray 10' projecting into a tab cavity formed by a tab catch opening 28 of the first tray 10 as shown in FIG. 8. The tab catch opening 28 preferably extends through the panel member 12 for facilitating release of the tab member 16A of the second tray 10' and/or release of the tab member 16 from the retracted position using a suitable tool (not shown).

With further reference to FIGS. 9-19, three trays 10 as in FIGS. 1-8 are joined in facing relation by tab engagement as described above, the lowermost tray having the tab portions 16 thereof in respective storage positions, and a fourth tray (N=4) corresponding to the tray 10' of FIGS. 5-8 is aligned for pivotal connection to the uppermost of the three trays as shown in FIG. 9. Each adjacently-connected pair of the trays 10 is pivotable on a respective one of the hinge axes 17 180° from an open, coplanar condition as shown in FIG. 7 to a closed, facing condition as shown in FIG. 9. As further shown in FIG. 9, a pair of the above-referenced axle members, designated 30, are aligned on the axle axis 21 of the middle one of the three trays 10 for insertion in the corresponding axle cavities 20.

As shown in FIGS. 10 and 11, the axle members 30 each have a stem portion 32 of rectangular cross-section for insertion into the axle cavities 20, an end extremity of the stem portion having an upwardly projecting barb 33 for releasable seated retention of the axle member in a selected one of the axle cavities, the barb having snap engagement with corresponding axle barb cavities that are formed by respective axle openings 34 that intersect the axle cavity as shown in FIG. 12. The axle members 30 each have a flange portion 35 that seats against the panel portion of the tray 10 adjacent the axle cavity 20, and a shaft portion 36 that extends from the flange portion oppositely coaxial with the stem portion 32. The flange portion 36 is formed with a recess 37 as shown in FIG. 11 for facilitating withdrawal of the axle member from the tray using a suitable tool (not shown), the axle openings 34 facilitating disengagement of the barbs, if necessary, using an additional tool (not shown).

Figure 15:
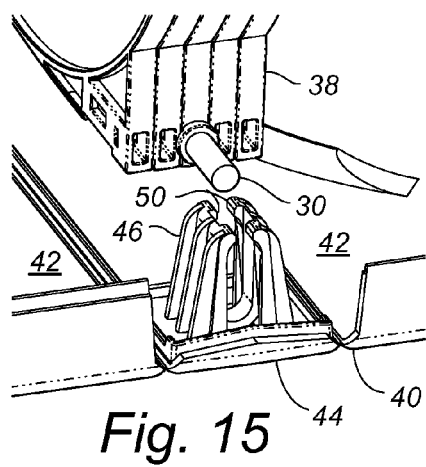
FIG. 15 is a perspective detail view within region 15 of FIG. 14.

FIG. 13 shows a connected stack 38 of five trays 10 with one of the axle members 30 seated in the axle cavity 20 of a central one of the trays, another of the axle members (not shown) being similarly seated in the opposite axle cavity of the central tray. FIGS. 14 and 15 show the above-described tray stack positioned for assembly into a storage case 40 having a pair of main panels 42 hingedly connected along opposite longitudinal edges of a spine member 44, a spaced pair of hinge pedestals 46 projecting upwardly from an inside surface 47 the spine member 44. Each of the main panels 42 has a counterpart of the hub 14, designated 45, formed on an inside surface 41 thereof for holding an additional disk. As best shown in FIG. 15, each hinge pedestal 46 forms a flange-reinforced upwardly facing U-shaped channel 48, inwardly facing detent elements 50 being located at an upper or distal extremity of the pedestal, the detent elements forming restrictions that produce snap engagement of the axle members 30.

Figure 17:
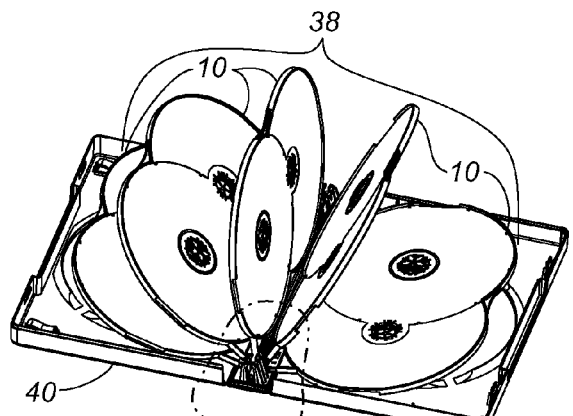
FIG. 17 is a perspective view showing the trays of FIG. 16 in fanned-out relation between opposite main panel portions of the case of FIG. 14.
Figure 18:
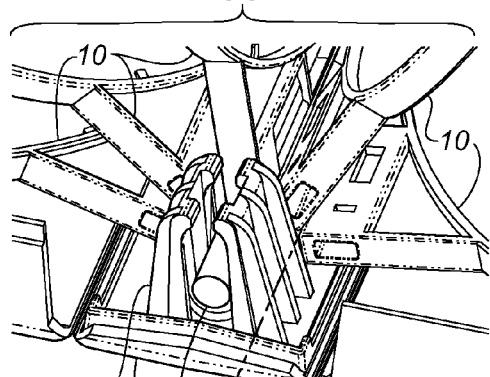
FIG. 18 is perspective detail view within region 18 of FIG. 17.
Figure 16:
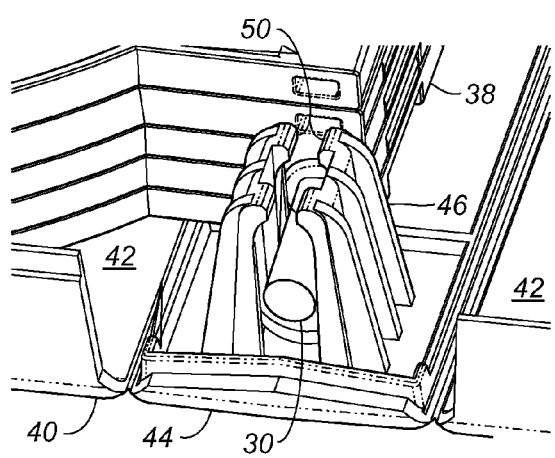
FIG. 16 is a detail view as in FIG. 14, showing the trays in facing relation against a main panel portion of the case of FIG. 14.

FIG. 16 shows the tray stack 18 snapped into engagement with the hinge pedestals 46 and laying over against one of the main panels 42; FIGS. 17 and 18 show the stack 18 hingedly separated in a fanned-out condition, adjacent pairs of the trays 10 being pivoted apart about different ones of the hinge axes 17, one such hinge axis being delineated by a broken line in FIG. 18.

Typically, the disk trays 10 and the storage case 40 of the present invention is configured for conventional disks having an outside diameter of 120 mm, an inside diameter of 15 mm, and a thickness of between 1.2 mm and 1.3 mm. A suitable material for both the trays 10 and the storage case 40 of the disk container 10 is polypropylene plastic. As shown in FIG. 19, an exemplary configuration of the case of FIG. 14 accommodates five of the trays 10, each of the trays being capable of holding a pair of the data disks and having a thickness t of approximately 0.156 inch (4 mm). The case in the closed condition thereof has a width W which can be approximately 1.08 inches (27.5 mm), the case having a capacity of twelve data disks having the above-described dimensions.

Figure 22:
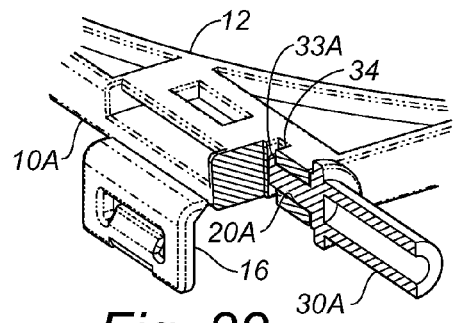
FIG. 22 is a sectional perspective detail view as in FIG. 12, showing the axle member of FIG. 20 engaged with a tray having an alternative configuration of the tray of FIG. 1.
Figure 21:
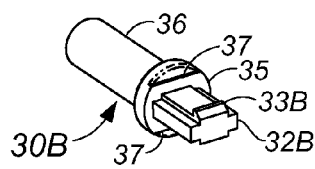
FIG. 21 is a rear perspective view of the axle member of FIG. 20.
Figure 20:
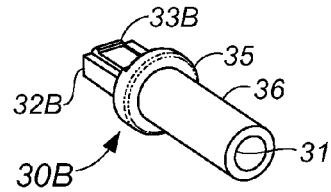
FIG. 20 is a front perspective view showing an alternative configuration of the axle member of FIG. 10.

With further reference to FIGS. 20-23, an alternate configuration of the axle members, designated 30A, is formed with the shaft portion 36 having an opening 31 there through as best shown in FIGS. 19 and 20. Also, the stem portion, designated 32A, is generally cross-shaped in cross-section for engagement with a correspondingly cross-shaped axle cavity, designated 20A, of a tray having that alternatively configured cavity, the tray being designated 10A. In other respects, the axle member 30A is formed with counterparts of the barb 33, the flange 35, and the recess 37 thereof. FIGS. 21 and 22 correspond to FIGS. 12 and 13, respectively, showing the axle 30A seated in the tray 10A, and in a central tray of a counterpart tray stack, designated 38A. The opening 31 advantageously conserves material of the axle member 30A; more importantly, a more uniform cross-sectional thickness facilitates molding without excessive shrinkage of the material. It will be understood that other shapes of the shaft portion also produce reduced cross-sectional thickness. For example, the shaft portion can have a cross-shaped cross-sectional shape for at least a portion of its length.

Figure 27:
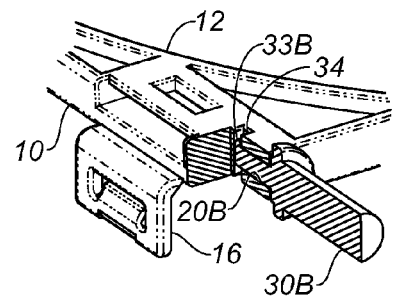
FIG. 27 is a sectional perspective detail view as in FIG. 9, showing the axle member of FIG. 22 engaged with the tray of FIG. 26.
Figures 24, 25:
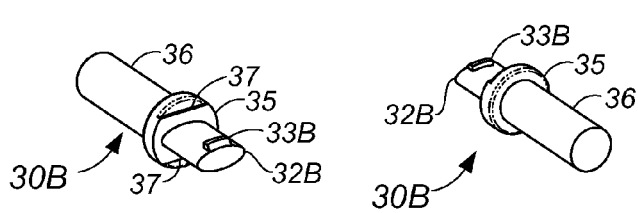
FIG. 24 is a front perspective view showing another alternative configuration of the axle member of FIG. 10.
FIG. 25 is a rear perspective view of the axle member of FIG. 24.
Figure 26:
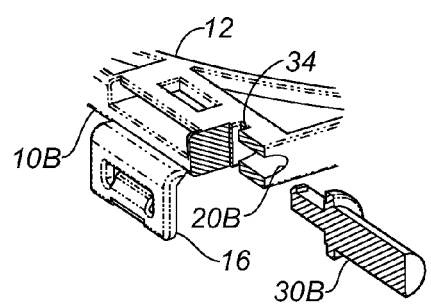
FIG. 26 is a sectional perspective detail view showing the axle member of FIG. 24 aligned for engagement with a tray having a corresponding alternative configuration of the tray of FIG. 1.

With further reference to FIGS. 24-28, another alternate configuration of the axle members, designated 30B, is formed with a counterpart of the shaft portion 36 of the axle member 30 of FIG. 10. As best shown in FIGS. 23 and 24, the stem portion, designated 32B, is generally oval or elliptical in cross-section for engagement with a correspondingly oval-shaped axle cavity, designated 20B, of a tray having that alternatively configured cavity, the tray being designated 10B, a counterpart of the barb, designated 33B, being modified for joinder with the oval shaped stem portion 32B. In other respects, the axle member 30B is formed with counterparts of the flange 35 and the recess 37 thereof. FIG. 25 shows the axle 30B aligned for insertion in the axle cavity 20B of the tray 10B; FIGS. 26 and 27 correspond to FIGS. 12 and 13, respectively, showing the axle 30B seated in the tray 10B, and in a central tray of a counterpart tray stack, designated 38B.

Figure 33:
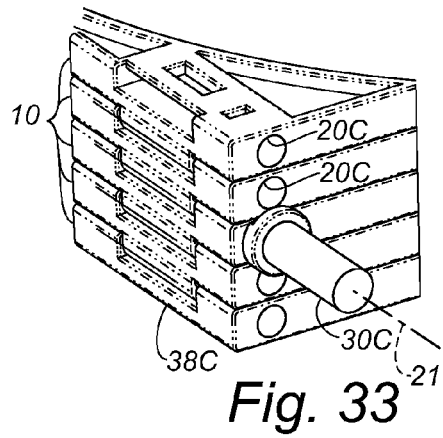
FIG. 33 is a perspective detail view as in FIG. 13, showing the axle member of FIG. 29 engaged with a central one of five trays having the configuration of FIG. 31.
Figure 32:
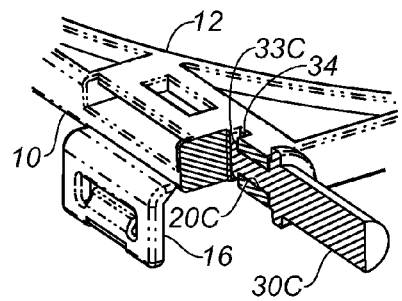
FIG. 32 is a sectional perspective detail view as in FIG. 12, showing the axle member of FIG. 29 engaged with the tray of FIG. 31.
Figures 29, 30:
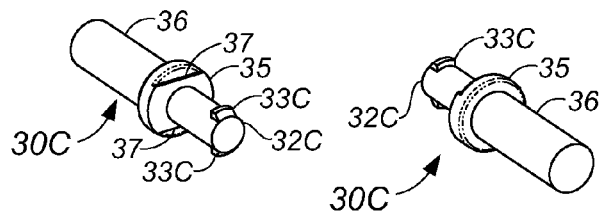
FIG. 29 is a front perspective view showing an additional alternative configuration of the axle member of FIG. 10.
FIG. 30 is a rear perspective view of the axle member of FIG. 29.
Figure 31:
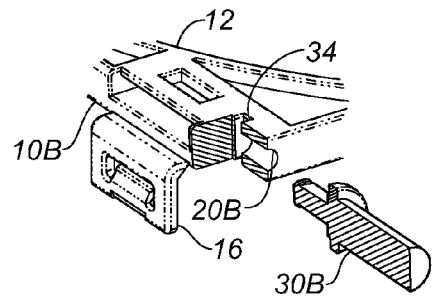
FIG. 31 is a sectional perspective detail view showing the axle member of FIG. 29 aligned for engagement with a tray having a corresponding alternative configuration of the tray of FIG. 1.
Figure 28:
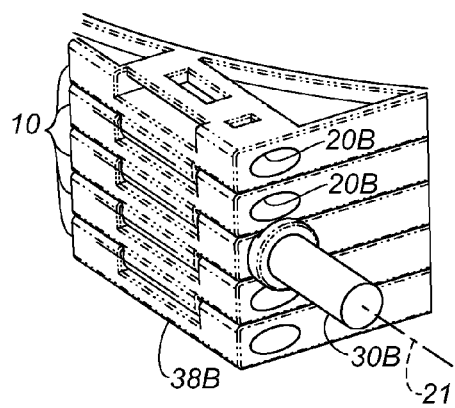
FIG. 28 is a perspective detail view as in FIG. 13, showing the axle member of FIG. 24 engaged with a central one of five trays having the configuration of FIG. 26.

With further reference to FIGS. 29-33, yet another alternate configuration of the axle members, designated 30C, is also formed with a counterpart of the shaft portion 36 of the axle member 30 of FIG. 10. As best shown in FIGS. 29 and 30, the stem portion, designated 32C, is generally round or circular in cross-section for engagement with a correspondingly round axle cavity, designated 20C, of a tray having that alternatively configured cavity, the tray being designated 10C, oppositely projecting counterparts of the barb, designated 33C, being modified for joinder with the round stem portion 32C. In other respects, the axle member 30C is formed with counterparts of the flange 35 and the recess 37 thereof. FIG. 31 corresponds to FIG. 26, showing the axle 30C aligned for insertion in the axle cavity 20C of the tray 10C; FIGS. 32 and 33 correspond to FIGS. 12 and 13, respectively, showing the axle 30C seated in the tray 10C, and in a central tray of a counterpart tray stack, designated 38C. Preferably, the axle members have a fixed angular orientation relative to the tray panel portion when engaged therewith, so that the recesses 37 have a predetermined orientation for facilitating use of the above-mentioned tool in withdrawing the axle members. This is obtained in the case of the axle members 30, 30A, and 30B having non-circular engagement with the respective axle cavities 20, 20A, and 20B. In the case of the axle member 30C having the circular cross-section, the barb openings 34 are configured for receiving the axle member in a fixed orientation, being prevented from rotation by the barbs 33C being rotationally captured within the barb openings 34.

Figure 34:
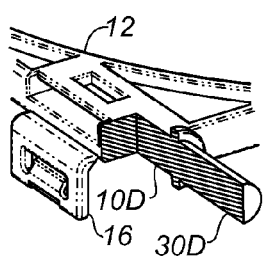
FIG. 34 is a sectional perspective detail view showing the axle member of FIG. 10 integrally formed with the tray of FIG. 1.

With further reference to FIG. 34, another alternative configuration of the tray, designated 10D, is integrally formed with counterparts of the axle member, designated axle portions 30D (one axle portion being shown). This configuration avoids any need for assembly of the axle members. It is contemplated that a counterpart of the tray stack 38 would be formed including a single one of the trays 10D and any suitable number of trays 10, 10A, 10B, 10C, or a counterpart of the tray 10 that lacks the axle cavities 20.

As another example of a preferred embodiment, while the disk tray is herein shown to have one forward and one rearward facing hub, it is also possible as an alternative to have both hubs facing the same direction, or to have four hubs per tray, two facing forward and two rearwards, for holding four disks per tray.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A disk storage system for disks of the type having a central opening, the storage system comprising:
   (a) a storage container comprising a pair of main panel portions hingedly connected together and a spaced pair of hinge pedestals, the storage container having open and closed conditions;
   (b) first and second adjacent disk trays, each disk tray comprising:
      (i) a tray panel portion having a hub for holding one of the disks;
      (ii) a tab portion directly hingedly connected to the tray panel portion on a hinge axis;
      (iii) a tab cavity in the tray panel sized for receiving a tab portion of an adjacent disk tray; and
      (iv) a tab storage cavity proximate the hinge axis sized for receiving a portion of the tab portion of the same tray in a storage position;
      wherein the tab portion of the first tray is received into the tab cavity of the second tray for hingedly connecting the first and second disk trays on the hinge axis of the first tray and pivotable about that hinge axis from an open, coplanar condition to a closed facing condition; and
      wherein the tab portion of the second tray is in the second tray tab storage cavity; and
   (c) a pair of axle members supported by at least one of the disk trays, each axle member having a shaft portion engaging respective ones of the hinge pedestals for pivotable support of the set of disk trays,
      wherein, the container in the closed condition encloses the disk trays.

2. The disk storage system of claim 1, wherein each tab portion has a tab catch formed thereon and each tray panel portion is formed having a tab catch cavity intersecting the tab cavity for snap engagement by a tab catch of a different disk tray.

3. The disk storage system of claim 2, wherein the tab catch cavity is formed by a tab catch opening in the tray panel portion for facilitating disengagement of the tab catch of the different disk tray.

4. The disk storage system of claim 1, wherein the tab portion is a first tab portion and the tab cavity is a first tab cavity, each of the disk trays further comprising:
   (a) a second tab portion hingedly connected to the panel portion on the hinge axis, the second tab portion being spaced apart from the first tab portion; and
   (b) each of the tray panel portions has a second tab cavity formed therein, the first and second tab cavities being spaced apart correspondingly to the first and second tab portions for receiving the second tab portion of a different disk tray, whereby the first and second disk trays become hingedly connected on the hinge axis of the first disk tray by both the first and second tab portions of the first disk tray engaging the first and second tab cavities of the second disk tray.

5. The disk storage system of claim 1, wherein each tray panel portion is formed having a lip projection extending into the tab storage cavity for releasably holding the tab portion in a the storage position.

6. The disk storage system of claim 1, wherein the axle members are oriented parallel to the hinge axis of the first tray.

7. The disk storage system of claim 1, wherein the pair of axle members are integrally formed with the panel portion of the at least one disk tray.

8. The disk storage system of claim 1, wherein the hub is a first hub, at least one of the tray panel portions having a second hub for holding an additional one of the disks.

9. The disk storage system of claim 8, wherein the first and second hubs are in offset relation to each other on opposite sides of the tray panel portion.

10. The disk storage system of claim 1, wherein the hinge pedestals are each formed having a U-shaped channel for engagement by the shaft portions of the axle members, the channel facing in a direction permitting the axle members to move along the channel when the at least one disk tray is pivoted about the axle members.

11. The disk storage system of claim 10, wherein the hinge pedestals each have a restriction element proximate a distal extremity of the U-shaped channel for snap engagement of the corresponding axle member.

12. The disk storage system of claim 1, wherein each of the main panel portions is formed having a hub on an inside surface thereof for holding an additional pair of disks.

13. A disk storage system for disks of the type having a central opening, the storage system comprising:
   (a) a storage container comprising a pair of main panel portions hingedly connected together and a spaced pair of hinge pedestals, the storage container having open and closed conditions;
   (b) first and second adjacent disk trays, each disk tray comprising:
      (i) a tray panel portion having a hub for holding one of the disks;
      (ii) a tab portion directly hingedly connected to the tray panel portion on a hinge axis;
      (iii) a tab cavity in the tray panel sized for receiving a tab portion of an adjacent disk tray; and
      (iv) a tab storage cavity proximate the hinge axis sized for receiving a portion of the tab portion of the same tray in a storage position;
   wherein the tab portion of the first tray is received into the tab cavity of the second tray for hingedly connecting the first and second disk trays on the hinge axis of the first tray and pivotable about that hinge axis from an open, coplanar condition to a closed facing condition; and
   wherein the tab portion of the second tray is in the second tray tab storage cavity; and
   (c) wherein at least one disk tray further comprises a pair of oppositely oriented axle cavities formed into opposite end extremity portions of the tray panel portion thereof for receiving a pair of axle members,
   each axle member having a shaft portion engaging respective ones of the hinge pedestals for pivotable support of the set of disk trays,
      wherein, the container in the closed condition encloses the disk trays.

14. The disk storage system of claim 13, wherein the tray panel portion is formed having a pair of axle barb cavities intersecting respective ones of the axle cavities for engagement by corresponding barbs of the axle members.

15. The disk storage system of claim 14, wherein each of the barb cavities is formed by an axle barb opening for facilitating disengagement of the axle barbs.

16. A disk storage system for disks of the type having a central opening, the storage system comprising:
   (a) a storage container comprising a pair of main panel portions hingedly connected together and a spaced pair of hinge pedestals, the storage container having open and closed conditions;
   (b) a set of 5 disk trays including first and second adjacent disk trays, each disk tray comprising:
      (i) a tray panel portion having first and second hubs for holding respective ones of the disks the hubs being in offset relation to each other on opposite sides of the tray panel portion
      (ii) a tab portion directly hingedly connected to the tray panel portion on a hinge axis;
      (iii) a tab cavity in the tray panel sized for receiving a tab portion of an adjacent disk tray; and
      (iv) a tab storage cavity proximate the hinge axis sized for receiving a portion of the tab portion of the same tray in a storage position;
   wherein the tab portion of the first tray is received into the tab cavity of the second tray for hingedly connecting the first and second disk trays on the hinge axis of the first tray and pivotable about that hinge axis from an open, coplanar condition to a closed facing condition, the tab portion of each of the other trays being received into the tab cavity of an adjacent tray;
   wherein the tab portion of the second tray is in the second tray tab storage cavity in its storage position; and
   (c) each of the main panel portions is formed having a hub on an inside surface thereof for holding an additional pair of disks,
   wherein the system in the closed condition of the case has an overall width W of not more than approximately 27.5 mm with each of the enclosed hubs capable of holding a data disk having a disk thickness of up to approximately 1.3 mm.

* * * * *